(12) United States Patent
Wolterman

(10) Patent No.: US 10,290,210 B2
(45) Date of Patent: May 14, 2019

(54) DISTRACTED DRIVER NOTIFICATION SYSTEM

(71) Applicant: Toyota Motor Engineering & Manufacturing North America, Inc., Erlanger, KY (US)

(72) Inventor: Michael J. Wolterman, Brighton, MI (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 122 days.

(21) Appl. No.: 15/403,740

(22) Filed: Jan. 11, 2017

(65) Prior Publication Data

US 2018/0194282 A1 Jul. 12, 2018

(51) Int. Cl.
*G08G 1/0962* (2006.01)
*B60W 40/08* (2012.01)
(Continued)

(52) U.S. Cl.
CPC ........... *G08G 1/0962* (2013.01); *B60W 40/08* (2013.01); *B60W 50/0097* (2013.01); *B60W 50/14* (2013.01); *B60Q 9/008* (2013.01); *B60W 2040/0818* (2013.01); *B60W 2550/22* (2013.01); *B60W 2550/308* (2013.01); *B60W 2550/402* (2013.01)

(58) Field of Classification Search
None
See application file for complete search history.

(56) References Cited

U.S. PATENT DOCUMENTS 7,412,317 B2 8/2008 Takamatsu et al.
8,031,062 B2 * 10/2011 Smith .................. G08G 1/0962
340/438

(Continued)

FOREIGN PATENT DOCUMENTS

JP 2007271345 10/2007
WO 2014070276 A2 5/2014
WO 2015114699 8/2015

*Primary Examiner* — Brent Swarthout
(74) *Attorney, Agent, or Firm* — Dinsmore & Shohl LLP

(57) ABSTRACT

A distracted driver notification system, a vehicle and a method of notifying a distracted driver. The system includes a communication system made up of one or both of an antenna and numerous sensors such that the communication system acquires data that is indicative of actual or expected vehicular movement in a traffic situation. The acquired data is conveyed to a computer for processing to determine if a traffic situation is present, as well as a change in status of such situation. The acquired or processed data may also be used to determine if a driver should be moving the vehicle in response to a change in the status of the traffic condition. A human-machine interface may include one or more of visual, haptic and audio configured to alert a distracted driver to start moving a vehicle that is equipped with the system, the alert based on a change in status of the traffic situation as acquired by the communication system and processed by the computer where such change is conducive to the movement of the vehicle, the system configured such that such alert is not provided when the vehicle is not in a traffic situation.

20 Claims, 3 Drawing Sheets

(51) Int. Cl.
*B60W 50/00* (2006.01)
*B60W 50/14* (2012.01)
*B60Q 9/00* (2006.01)

(56) References Cited

U.S. PATENT DOCUMENTS

| | | |
|---|---|---|
| 8,244,410 B2 | 8/2012 | Wu et al. |
| 8,972,076 B2 | 3/2015 | Ogawa |
| 9,349,292 B2 * | 5/2016 | Yang |
| 9,460,601 B2 | 10/2016 | Mimar |
| 2007/0276581 A1 * | 11/2007 | Bae ........................ G08G 1/16 701/117 |
| 2015/0274072 A1 * | 10/2015 | Croteau ................ E21F 11/00 340/903 |
| 2016/0314689 A1 * | 10/2016 | Priest, III .............. B60W 50/14 |
| 2017/0243481 A1 * | 8/2017 | Neubecker ............ G08G 1/095 |

* cited by examiner

DISTRACTED DRIVER NOTIFICATION SYSTEM

TECHNICAL FIELD

The present specification relates generally to a system to improve driver situation awareness, and more particularly to a system that can detect evidence of driver inattentiveness within a particular traffic situation, and alert the driver of such inattentiveness if the driver doesn't take his or her own steps to take corrective measures against such inattentiveness.

BACKGROUND

Driver distraction while using personal devices such as cell phones, tablets, or other electronic devices is a significant cause of annoyance to other drivers, as well as a potential safety hazard. In one form, the problem includes situations where the vehicle is in slow or stopped traffic, including those associated with a traffic control device such as a red light, stop sign or the like. When distracted drivers do not maintain the traffic flow in such circumstances, the number of vehicles that are able to get through an area of interest within the allotted time is decreased, which in turn leads to congestion and associated delays. In one notable example, failure to move once other vehicles that are ahead start to move through an intersection during each traffic control device cycle increases the queue of vehicles at the intersection, which in turn exacerbates congestion in the surrounding area.

Many vehicles now have electronic vision systems to monitor the forward view of a vehicle, including forward collision warning, automatic emergency braking, lane keeping, adaptive cruise control or the like. Likewise, many vehicles are equipped with navigation systems to provide spatial information. Vehicles so equipped can provide range and range-rate signals of forward vehicles, while an alarm is provided to the driver to inform him or her of the corresponding distance and closure/separation rate information between the equipped vehicle and the forward vehicle in situations where the system determines that the driver is distracted. In a related form, other systems may improve driver situational awareness at intersections. By prompting the driver that a traffic control device (such as a traffic light) has changed, such a system can help a driver better identify the status of the traffic control device in order to improve driver response time and reduce the likelihood of a backup, including in situations where the equipped vehicle is not the first in line at the traffic control device.

While useful for their intended purpose, such systems do not rely upon their sensors to look for indicia (such as illuminated brake lights or the like) of a stopped vehicle immediately in front of the equipped vehicle as a way to decide whether to send a warning to the driver of the equipped vehicle, as discussed above. Moreover, such systems do not appear to distinguish traditional traffic situations from those in a parking lot, driveway or the like where traditional traffic-congestion issues are either inapplicable or of significantly reduced concern. By failing to take such different circumstances into consideration, such a system tends to be a source of additional distraction or aggravation to the driver rather than as an aid to improved situation awareness.

SUMMARY

In one embodiment, a distracted driver notification system is disclosed. The system includes numerous sensors, a computer and a human-machine interface (HMI). The sensors acquire data that provides indicia of actual or expected vehicular movement in a traffic situation, while the computer is signally cooperative with the sensors to process the data they gather, and the HMI configured to alert a distracted driver to start moving a vehicle that is equipped with the system. The alert is based on a change in status of the traffic situation as acquired by the sensors and processed by the computer where such change is conducive to the movement of the equipped vehicle. This change is compared to whether the equipped vehicle is undertaking such movement such that if the system determines that the equipped vehicle could be moving but isn't, the driver may be in a distracted state. Significantly, the system avoids providing such an alert when the vehicle is in a parking lot, driveway or other environment that doesn't satisfy the traffic situation criteria.

Within the present context, an actual vehicular movement includes those situations where evidence of actual vehicular movement is underway, such as that measured by visual, doppler, speedometer, odometer, infrared, lidar (light detection and ranging user laser light) or related means, while an expected vehicular movement includes those situations where evidence of the removal of a forward impediment to movement is partially or completely abated, such as the changing of a traffic light from red to green, or the visual, doppler, infrared, lidar or related detection that vehicles forward of the equipped vehicle are moving farther away.

Furthermore, within the present context, a traffic situation is that where the vehicle equipped with the system is on a public destination-oriented thoroughfare such as a roadway (whether toll-based or toll-free) with at least one adjacent vehicle where a temporary impediment to the flow of traffic is present as a result of a traffic light or related traffic control device, road construction, congestion, accident or related obstruction. In one form, such adjacent vehicle is situated rearward of the equipped vehicle such that the adjacent vehicle's freedom of forward movement would be hindered by the equipped vehicle in the event the driver of the equipped vehicle fails to move the equipped vehicle forward upon the change in status of the traffic situation that leads to the removal of such impediment, such as a change in traffic light from red to green or the removal of an obstruction such as an accident, disabled vehicle, pedestrian, animal or other temporary event that contributes to congestion and related lack of traffic flow. Such traffic situations do not include those associated with the vehicle traversing a parking lot (including public parking garages or the like) or a driveway or garage of a private residence.

Further within the present context, a traffic control device is construed relatively broadly to encompass all devices or signs—whether static or light-emitting—used to provide control or information to vehicles on a road or related thoroughfare, while a traffic light is construed more narrowly to encompass the traditional red-yellow-green signals that are commonly used at an intersection. As such, a traffic control devices may include—in addition to traffic lights—flashing yellow lights, walk/don't walk signals, as well as road signs such as stop signs, yield signs, merge signs or other road symbol signs such as those used in compliance with United States Department of Transportation's Federal Highway Administration regulations. In situations where the traffic control device is a static device (such as a stop sign, yield sign or the like where no light-emitting or electronically-varying signal is being transmitted), it will be understood that a change in status of such device coincides with a change in traffic pattern associated with the orderly proceeding of one or more vehicles along a portion of the thoroughfare being regulated by the device.

Likewise, within the present context, a change in status that is conducive to the movement of the vehicle is that where the cause of the impediment that led to the traffic situation is removed. By way of example, such a change includes a traffic light changing from red to green in the direction the vehicle is traveling. In another example, such a change includes where a vehicle directly ahead of the equipped vehicle starts to move. In yet another example, such a change includes where the equipped vehicle proceeds in due course after encountering a stop sign or unscheduled stops such as those associated with traffic accidents, lane narrowing or other impediments to the flow of traffic. Such change is out of necessity limited to forward movement that is not expected to lead to contact between the equipped vehicle and one or more other vehicles or other objects on the thoroughfare that are forward of the vehicle.

In another embodiment, a vehicle is disclosed. The vehicle includes a platform made up of a wheeled chassis that is propelled by an engine that is coupled to a control apparatus cooperative with the wheeled chassis and the engine in order to provide motive control. The vehicle also includes a distracted driver notification system that includes numerous sensors, a computer, a communication system and an HMI. The sensors acquire data that provides indicia of actual or expected vehicular movement in a traffic situation, while the communication system provides communications with nearby vehicles or infrastructure and the computer is signally cooperative with the sensors and the communication system to process the data they gather and can notify the HMI to alert a distracted driver to start moving the vehicle. The alert is based on a change in status of the traffic situation as acquired by the sensors and the communication system and processed by the computer where such change is conducive to the movement of the equipped vehicle. This change is compared to whether the equipped vehicle is undertaking such movement such that if the system determines that the equipped vehicle could be moving but isn't, the driver may be in a distracted state. Significantly, the system avoids providing such an alert when the vehicle is in a circumstance where frequent or long-term vehicle stops are contemplated, such as parking lot, public parking garage, private residence driveway, private residence garage or other environment that doesn't satisfy the traffic situation criteria.

In yet another embodiment, a method of notifying a distracted driver is disclosed. The method includes acquiring data with vehicle-mounted sensors and an antenna that are used as part of—or in conjunction with—a communication system, processing the data received from the sensors in a computer, ascertaining with the computer whether the driver of the vehicle is distracted by determining if there is a change in status of the traffic situation as acquired by the plurality of sensors and processed by the computer where such change is conducive to the movement of the equipped vehicle and comparing the changed traffic situation data with whether the equipped vehicle is undertaking such movement. In this way, if the system determines that the equipped vehicle could be moving but isn't, the driver may be in a distracted state, at which time the system may alert the distracted driver to start moving the vehicle. The system does not alert the driver if either the vehicle is not in a traffic situation or if it is determined that the driver is not in a distracted frame of mind.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Embodiments disclosed herein include a system to monitor traffic conditions such that it can be used to alert distracted drivers that a vehicle stopped ahead of them has started to move in traffic situations where frequent stops, starts and slow-moving traffic is encountered. Such situations may include traffic lights, stop signs, accident scenes, construction sites or other locale on a thoroughfare where traffic congestion is likely to be encountered. In one particular form, a system in accordance with the present disclosure uses a communication system to monitor the traffic conditions ahead of the equipped vehicle and provide an alert to a driver that is determined to be distracted. In one form, both the distracted driver notification system and the communication system could be integrated into other systems within the equipped vehicle, while in another form they could be added as stand-alone systems such that the vehicle with which they are cooperating would become an equipped vehicle.

Figure 1:
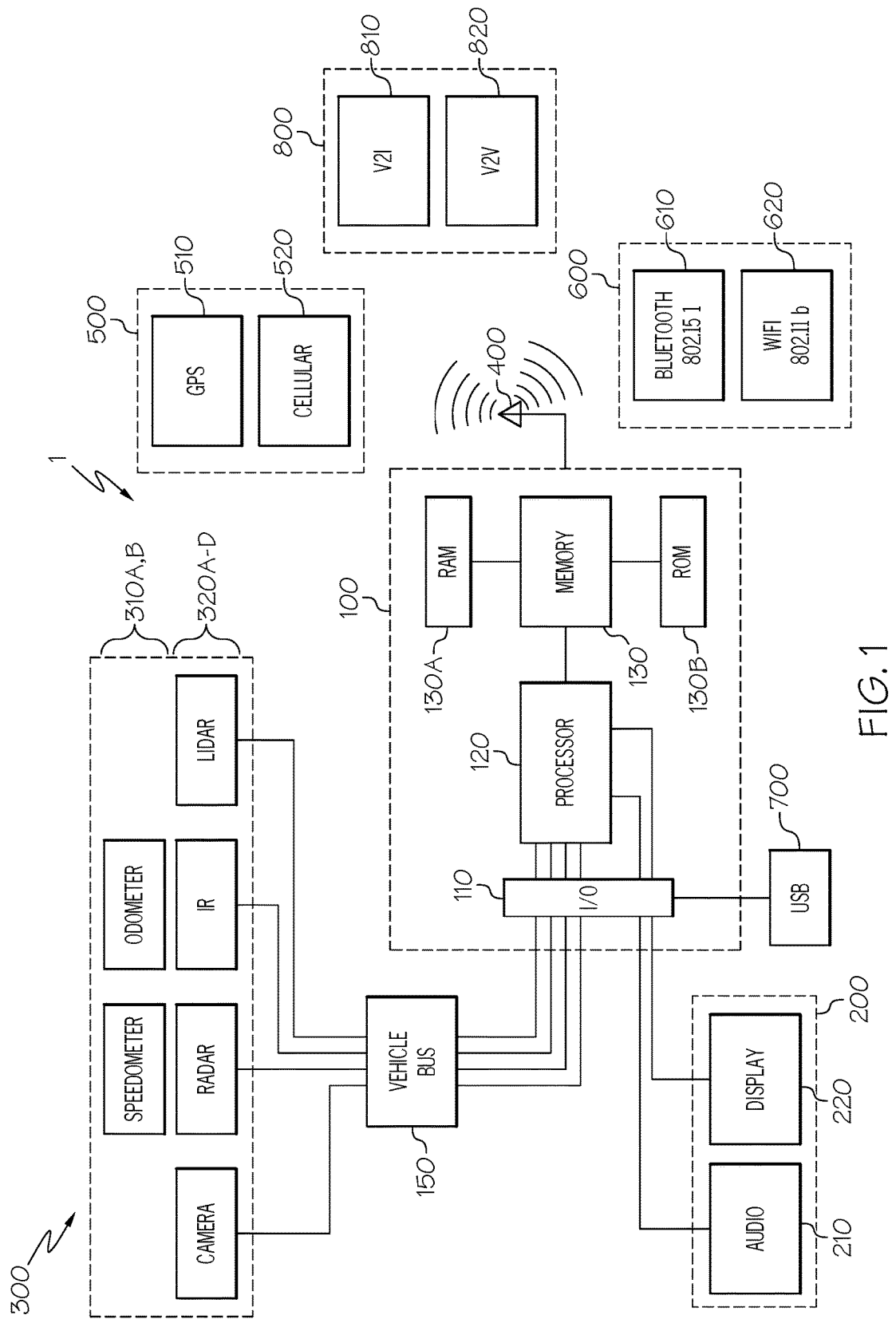
FIG. 1 depicts a block diagram depicting some of the functional units within a driver distraction detection system in accordance with one or more embodiments shown or described herein.

Referring first to FIG. 1, a block diagram depicting some of the components that provide the functional attributes of a distracted driver notification system 1 is shown. One benefit of the system 1 of the present disclosure is its ability to be implemented in automated data processing equipment, such as that associated with a digital computer 100 or related information processing system. In such case, the automation may take place through control logic, program code or a related algorithm in the form of computer-executable (i.e., machine-readable) instructions that can be performed, run or otherwise conducted on the computer 100. Such computer-executable instructions may be written in any programming language, including machine language that may be directly executed by a processor as discussed below, assembly language, object-oriented programming (OOP) language, scripting languages, microcode or the like that may be compiled or assembled and stored in memory as discussed below. Alternatively, the machine readable instructions may be written in a hardware description language (HDL), such as logic implemented via either a field-programmable gate array (FPGA) configuration or an application-specific integrated circuit (ASIC), as well as their equivalents. As such, the system and methods described herein may be implemented in any conventional computer programming language, as pre-programmed hardware elements, or as a combination of hardware and software components.

In one form, the computer 100 may be configured as one or more electronic control units (ECUs) that may be placed in the vehicle. In situations where numerous such ECUs are present, they may be distributed throughout the vehicle at locations suitable to their intended function. Regardless of the form, the computer may be configured to include one or more of an input and output (I/O) 110, a processing unit (often referred to as a central processing unit (CPU) or more generally as a processor) 120 and memory 130 the last of which can temporarily or permanently store such a code, program or algorithm such that the instructions contained in the code are operated upon by the processing unit 120 based on input data received by I/O 110 such that output data generated by the code and the processing unit 120 can be conveyed to another program or a user via I/O 110. It will be appreciated that instead of a single CPU, the processing unit 120 may be in the form of numerous distributed microprocessors or related processing means, and that either variant is deemed to be within the scope of the present disclosure as long as they are capable of executing the machine-readable versions of the control logic, program code or related algorithm. In one form, a data-containing portion of the memory—also associated with volatile working memory—is referred to as random access memory (RAM) 130A, while an instruction-containing portion of the memory—also associated with permanent or non-volatile memory—is referred to as read only memory (ROM) 130B. Thus, it will be appreciated by those skilled in the art that computer-executable instructions that embody the calculations discussed elsewhere in this disclosure can be placed within an appropriate location (such as the aforementioned memory 130) within computer 100 in order to achieve the objectives set forth in the present invention. In one form, the computer 100 may additionally include additional chipsets (not shown) for peripheral functions. In addition to the control logic, program code or related algorithm, memory 130 may be configured to store object detection logic, object recognition logic, as well as auditory message generation logic, all as described in more detail below.

Such a computer 100 as discussed herein is generally referred to as having a von Neumann architecture, and is configured to perform the specific automated steps outlined in this disclosure. Upon having the program code means loaded into memory 130 in general (and in one form into ROM 130B in particular), computer 100 becomes a specific-purpose machine configured to determine the driver distraction parameters in a manner as described herein. As such, computer 100 becomes a particularly-adapted computer or computer-related data processing device that employs the salient features of such an architecture in order to perform at least some of the data acquisition, manipulation or related computational functions discussed herein. As shown, computer 100 depicts an autonomous (i.e., stand-alone) unit; as will be appreciated by those skilled in the art, in one form it may be the part of a larger network such as those encountered in cloud computing, where various computation, software, data access and storage services may reside in disparate physical locations. In one form (not shown), computer 100 need not be located on-board the vehicle 10, such as those configurations associated with cloud computing. Such a dissociation of the computational resources does not detract from such a computer 100 being within the scope of the present disclosure.

A data bus 150 or related set of wires and associated circuitry forms a suitable data communication path that can act as a local interface or related interconnect for the I/O 110, processing unit 120 and memory 130, as well as any peripheral equipment in such a way as to permit the computer 100 to operate as an integrated whole. The bus 150 may be configured to include control, address and data features, and can be arranged in any conventional format, including controller area network (CAN), local interconnect network (LIN) and vehicle area network (VAN) and related variants. Likewise, a communication path formed by bus 150 may signally couple any number of components within the system 1 to one another, regardless of whether they operate in a distributed or stand-alone computing environment. In one form, other devices may be coupled to the I/O 110 (either through the bus 150 or directly, the latter as shown), while in another form, such devices may make up the I/O 110, depending on the degree of structural integration where with higher levels of such degree, component redundancy may be reduced or avoided.

HMI 200 may be configured to act as a vehicle console or related head unit within a passenger compartment of vehicle 10 so that driver 5 input to and response output from (through one or both of audio 210 and visual, the latter in the form of display 220) the computer 100 may be used to complete tasks such as inputting program preferences or settings, providing commands and providing feedback to the system 1. An input of HMI 200 may take on any appropriate form, including—in addition to conventional tactile means such as keyboard, touchpad, mouse or touchscreen—voice-driven means such as a microphone or related audio transducer. In addition, the HMI 200 may be part of (or work in conjunction with) a vehicular telematics system with one or both of vehicle-to-infrastructure (V2I) and vehicle-to-vehicle (V2V) communication system functionality (as will be discussed in more detail below) to wireles sly send and receive outside source of data, such as that delivered over the internet through near-field communications (such as Bluetooth, WiFi or related mechanisms) or far-field communications (such as cellular or satellite).

HMI 200 may include one or more computer-readable medium loaders (not shown, but which may be in the form of a drive for receiving magnetic or optical data storage mediums in the form of CDs, DVDs, USB port (including flash) or the like. These loaders may be used to introduce additional control logic or other data (for example, static map updates or the like) as a way to place data or program instructions from one computer-usable medium to memory 130 on computer 100. As with memory 130, these data storage devices may be configured as volatile or nonvolatile memory devices such that while physically separate, may also serve the memory 130 functions discussed herein. In one form, the memory 130 and any of the control logic, program code or a related algorithm in the form of computer-executable instructions that resides thereon is non-transitory in that it exists as tangible media rather than as a propagated signal per se.

The sensors (collectively 300 but individually as numbered below) include those used for operational monitoring of conventional vehicle 10 systems and their components; such sensors may include those used to measure temperatures, pressures, electrical current, fluid levels or the like. For example, sensors coupled to a speedometer 310A measure the speed of vehicle 10, while sensors coupled to an odometer 310B measure the distance that vehicle 10 travels.

Other sensors maybe used to acquire data for delivery to and use by system 1. These sensors may be placed at various places in and around the vehicle 10. In one form, these sensors may be placed in various peripheral locations to maximize the field-of-view, such as in the front and rear bumpers, mirrors, the grille, as well as outward-looking device from the passenger compartment. As such, these other sensors may be configured to detect radiation in any desirable wavelength band, such as the ultraviolet wavelength band, the near-ultraviolet wavelength band, the visible light wavelength band, as well as various infrared wavelength bands, including near-infrared, infrared or far-infrared band. In one form, these sensors 300 may interact with the computer 100 directly, while in another form, the interaction could be indirect. In either event, such interaction may also use other hardware, such as amplifiers, drivers, digital-to-analog converters, analog-to-digital converters or the like none of which are shown).

For example, the image-capturing sensors may include one or more digital cameras 320A capable of acquiring still images or digital video images. The digital cameras 320A act as image sensors that may be configured as a charge-coupled device (CCD) or a complementary metal-oxide-semiconductor (CMOS) capable of detecting optical radiation having wavelengths in the visual spectrum. Such cameras 320A may be configured in any known resolution, such as standard definition (640 pixels by 480 pixels), high definition (1440 pixels by 1024 pixels, or 1280 pixels by 1024 pixels) or ultra high definition (3840 pixels by 2160 pixels), although other resolutions are also deemed to be within the scope of the present disclosure. Such cameras 320A may be used for lane-departure warnings and related situational awareness notification, as well as in conjunction with one or more of the sensors mentioned below.

Likewise, the image-capturing sensors may be configured to detect optical radiation in wavelengths outside of the visual spectrum. For example, sensors may include one or more infrared (IR) detectors 320B (also referred to as thermal imaging camera, thermographic camera or the like) where the wavelengths tend to be much longer than the 400 to 700 nanometer range of the visible spectrum, often into the micrometer range. In one form, an IR-based detector 320B may be used for night-vision applications based on either a gated or non-gated active system where the sensor 320B or a separate antenna sends out the signal so that the detector 320B (which in one form may be configured as the aforementioned CCD camera) picks up the return radiation. The IR detectors 320B may be in one form integrated into the headlights 70 of vehicle 10. In such case, the light being emitted from the headlight 70 (which can be filtered such that only the select IR wavelength gets projected onto an object in its field-of-view, after which the reflection may be captured by the detector IR detector 320B, after which it can be sent to computer 100 acting in its capacity as an ECU or the like for further processing and display on HMI 200. In another form, the IR detectors 320B may be used as part of a vehicle navigation system that may be integrated into or operate in conjunction with a navigation system.

Furthermore, the image-capturing sensors may be configured to emit and receive microwave radiation. For example, sensors may include one or more radar sensors 320C at known frequencies, such as millimeter-wave radar (roughly 30 to 300 GHz), K-band (roughly 18 to 27 GHz) or X-band (roughly 8 to 12 GHz), or the like. Such sensors 320C may be especially useful for dynamic/adaptive cruise control. Radar-based sensors 320C may be used in conjunction with cameras (such as optical camera 320A discussed above) to detect the presence of one or more vehicles or other objects in front of vehicle 10, as well as for automated braking and related movement-control functions.

In addition, the image-capturing sensors may be configured to emit and receive coherent optical radiation for circumstances where collimated beam precision and related lack of return signal estimation is desired. For example, sensors may include one or more lidar sensors 320D. In one form, the lidar sensors 320D may be made as solid-state devices with few or no moving parts, including those configured as optical phased array devices where its prism-like operation permits a wide field-of-view without the weight and size complexities associated with traditional rotating lidar detectors. As with the radar sensors 320C, lidar sensors 320D are particularly suited to measuring time-of-flight, which in turn can be correlated to distance measurements. As with IR detectors 320B, lidar sensors 320D may in one form be operated in or near the infrared range of the electromagnetic spectrum, with one example having emitted radiation of about 905 nanometers. Sensors such as lidar 320D can be used by vehicle 10 to provide detailed 3D spatial information for the identification of objects near the vehicle 10, as well as the use of such information in the service of systems for vehicular mapping, navigation and autonomous operations, especially when used in conjunction with geo-referencing devices such as GPS 510 or a gyroscope-based inertial measurement unit (not shown), as well as memory (either its own or memory 130 of computer 100).

The sensors 300 may also include a microphone (not shown) or related auditory device to capture sound. As with the other sensors discussed herein, the microphone may be configured as capable of receiving auditory signals from the processor 110 (either directly or indirectly from other hardware, such as amplifiers, drivers, digital-to-analog converts, and the like) to produce auditory message capable of being heard by the driver 5. In one form, the acoustic signals being sensed may include sonar for clearance control The images or other data captured by the sensors 320A, 320B, 320C or 320D are coupled to the computer 100 through the vehicle bus 150 so that control signals sent from the computer 100 can instruct the sensors 300 to acquire image data of an operating space around vehicle 10, and to send the acquired image data to the processors 120 or memory 130 for respective processing or storage. In one form, the acquired image data digitally represents objects within the scene; such objects may include other vehicles, landmarks, pedestrians, cyclists, animals, or the like. With particular regard to other vehicles, the sensors may be tuned to acquire relative movement information (such as through doppler/radar, lidar, optical or the like), as well as light-based imagery through IR, photodiode or optical means, where such light-based imagery may include whether a traffic light 800 is emitting red light, yellow light or green light.

In one form, the computer 100 is configured to automatically detect an object, such as through actively sending a signal and receiving a return signal. In such case, the computer 100 may also be configured to automatically recognize the detected object with object recognition software loaded into memory 130. Such object recognition software may be configured to automatically recognize one or more of shapes, colors or other indicia to help the system 1 identify a candidate object. Through the use of such object recognition software, the computer 100 may receive image data from the sensors 300 and provide indicia of objects including other vehicles, pedestrians, traffic control devices or other things in or around the roadway that may give rise to a traffic situation.

One or more antennas 400 may be used to effect signal communication between system 1 and telecommunications networks such as far-field wireless networks 500 including one or more of satellite (for example, GPS) 510 or cellular 520 configurations. In such circumstances, computer 100 includes navigation system functionality and telephone functionality in addition to other conventional radio-frequency communication functionality such as that associated with known telematics systems. In addition, such antenna or antennas 400 may be used to effect signal communication with near-field networks 600 via wireless (such as Bluetooth 610 or related Wifi 620) in or around vehicle 10, while a wired signal communication approach (such as USB 700) may also be used for on-board use. Within the present context, the term "signal" is meant to include a waveform (for example, in electrical, optical, magnetic, acoustic or electromagnetic form), and that such form may include direct current (DC), alternating current (AC), sinusoidal-wave, triangular-wave, square-wave, vibration and related variants all of which are capable of traveling through a suitable medium Likewise, the terms "signal communication", "signally coupled", "communicatively coupled" and their variants mean that coupled components are capable of exchanging data signals with one another where for example the data signals are electrical signals conveyed via conductive medium, electromagnetic signals conveyed over the air, optical signals conveyed over optical waveguides, or the like. In wired form, such conductive medium may include a combination of conductive traces, conductive wires, connectors, and buses that cooperate to permit the transmission of electrical data signals to and from the computer 100 and signally-coupled devices such as HMI 200, sensors 300 or the like. With particular regard for a signal arriving from the GPS 510, the signal received into the antenna 400 is transformed into a data signal indicative of the triangulated location (latitude and longitude) of the vehicle 10, as well as vehicle 10 direction and speed. As mentioned above, such data signal may be operated upon by computer 100. In circumstances where antenna 400 is collecting signal data from an outside source such as GPS 510 or the cellular network 520, and further where the signal data is being used to provide navigation or related vehicular position information to vehicle 10, antenna 400 is understood within the present context to function as a sensor in a manner analogous to the sensors 300 discussed herein in that it acquires data for processing by computer 100. Although not shown, one or more network interface devices may be included to couple the system 1 to one or more remote networks through the antenna 400. The navigation system may also provide additional information on the location of the equipped vehicle 10. For example, use of the navigation system of vehicle 10 as part of the overall system 1 may additionally be beneficial in that it can provide the locations of traffic lights 800 and other traffic control devices (such as shown in conjunction with FIG. 2) that are noted in its database so that the confirmation of a traffic light 800 or other traffic control device can be directly acquired from the navigation system. As such, the navigation system is integrated into or is otherwise cooperative with the communication system as embodied by one or more of computer 100, sensors 300 and antenna 400, as well as the other vehicle or infrastructure sensors, transmitters, beacons or related signal-conveying devices.

As mentioned above, a combination of some or all of the sensors 300 and other components making up system 1 along with the antennas 400 and their ancillary structure (not shown) will be understood to form a part of communication system with which to establish a wireless exchange of information with far-field wireless networks 500 and near-field wireless networks 600. Such a communication system may also be used as part of a vehicular ad hoc network (VANET) 800 in general, and to a V2I) network 810 and a V2V network 820 in particular. In the V2V network 820, each vehicle acts as a node that forms a part of a larger communication system that does not rely upon pre-existing communications infrastructure. The V2V network 820 was implemented by the National Highway Traffic Safety Administration (NHTSA) as part of new Federal Motor Vehicle Safety Standard (FMVSS) 150. One proposed performance requirement for V2V networks (such as the V2V network 820 shown in FIG. 2) under FMVSS 150 is the inclusion of a dedicated short-range communications (DSRC) device that operates on wireless communication channels at 5.9 GHz in something known as device-to-device (D2D) communication such as those implemented by the IEEE 802.11p DSRC standard. The increased transmit power allowed in the 802.11p standard enables longer range communications. Such longer-range communication is beneficial in a V2V network 820 where the equipped vehicle 10 is several vehicles back from a traffic light 810 or other traffic control device. In such circumstance, if the lead vehicle in the queue at the traffic light 810 sends a signal that the light has changed or that it is moving through the intersection, the equipped vehicle 10 can look for motion in the vehicles ahead of it and alert the driver 5 if he or she does not react to such motion.

Likewise, the components making up system 1 along with one or both of the antennas 400 and sensors 300 in conjunction with their ancillary structure will be understood to form the communication system as part of the V2I network 810. The infrastructure part of the V2I network 810 is shown in the form of a traffic light 810 that may be configured with beacons 810A or related transmitters that can convey one or more signals to the sensors 300 or antenna 400 for subsequent processing by computer 100. In one form, such beacons 810A may operate in a known frequency band (such as 700 MHz) to detect oncoming vehicles, pedestrians and other objects that might be present at a traffic intersection or other possible point of congestion so that they can convey it to system 1 through one or more of the sensors 300.

Figure 2:
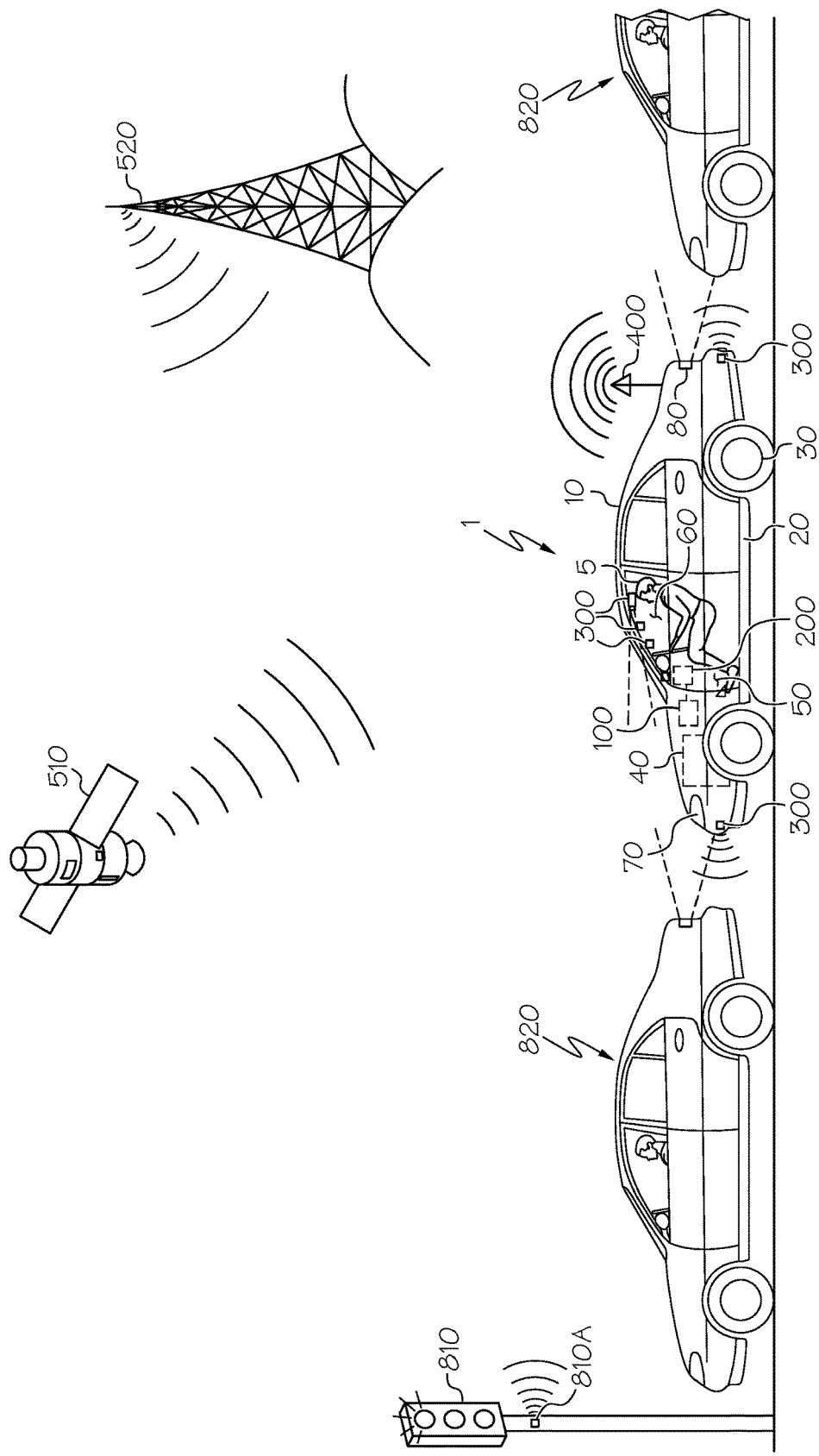
FIG. 2 depicts a vehicle using the system of FIG. 1 within a notional traffic situation.

Referring next to FIG. 2 and regarding GPS 510, in one form, navigation-related data may be formed as a combination of a static database and a dynamic database, where the former includes geographical information pertaining to known or previously traveled segments and routes, while the latter includes temporal information pertaining to when particular routes or segments were traveled. In embodiments that include a static database, such database generally includes a segment list and a route list, while in embodiments that include a dynamic database, such database generally includes a route history. In some embodiments that include a static database and a dynamic database, the static database and dynamic database are stored in XML format, though it will be appreciated that the static database and dynamic database may be stored in any other suitable format, although it will be understood that the use of a static-versus-dynamic database for operation of the navigation-related data is not required.

Moreover, the communication between the GPS 510 and the system 1 may be achieved through the HMI 200 where visual information in the form of maps or the like is shown on display 220 mounted in a passenger compartment of the vehicle 10. In addition to maps for depicting roadways and navigation patterns around the vehicle, such visual information from the display 220 may also include that used for entertainment, information or a combination thereof. The display 220 may include any medium capable of transmitting an optical output such as, for example, light emitting diodes, a liquid crystal display, a plasma display a cathode ray tube or the like. As mentioned above, the display 220 may also be configured as a touchscreen that—in addition to providing optical information—detects the presence and location of a tactile input upon a surface of or adjacent to the display 220. In some embodiments, the display 220 and the touchscreen are combined as a single module within HMI 200, while in others, the touchscreen and its tactile input hardware may be separate from the displayed GPS 510 and related navigational or map data; in either configuration, may exchange signals with one another through bus 150 or other suitable communication path. In another form, GPS 510 may communicate with driver 5 without the need for a display 220, and instead do so solely through the audio 210 portion of HMI 200 or a haptic input to the driver 5 (such as through vibrations in the steering wheel or the like). This is useful in embodiments in which the navigation system portion of computer 100 is used to predict a route based on one or both of turn determination and segment identification such that it automatically utilizes the predicted route to optimize a vehicle 10 operating parameter based on the predicted route.

It will be appreciated that system 1 may include additional components not illustrated in FIG. 1, such as a power source, voltage regulators, analog-to-digital converters, digital-to-analog converters, drivers, signal conditioning circuits, electromagnetic filtering circuits, and the like, and that insofar as any or all of these additional components and their functions are useful to ensure proper functionality of system 1, are deemed to be incorporated by reference as being within the scope of the present disclosure.

Referring with particularity to the vehicle 10 that is equipped with system 1 as discussed herein (also referred to herein as the equipped vehicle 10) that is depicted in FIG. 2 as being operated by driver 5, the vehicle 10 is in a line of traffic that is stopped at a traffic light 800 with other vehicles. Vehicle 10 includes a chassis 20 with a plurality of wheels 30. Chassis 20 may either be of body-on-frame or unibody construction, and both configurations are deemed to be within the scope of the present disclosure. A motive power unit 40 such as a conventional internal combustion engine (ICE), battery pack, fuel cell stack or a hybrid combination of one or more of the above may be situated in or on the chassis 20 to provide propulsive power to the vehicle 10. As shown, the motive power unit 40 is situated underneath a hood that is placed at the fore end of vehicle 10. A guidance apparatus 50 (also referred to herein as a control apparatus that may include, among other things, steering wheel, accelerator, brakes, transmission and gear shifter, none of which are shown) is used in cooperation with the wheels 30, motive power unit 40 and other systems to control movement of the vehicle 10. A passenger compartment 60 is formed inside the chassis 20 and serves not only as a place to transport passengers and cargo, but also as a place from which a driver may operate vehicle 10. Headlights 70 and brake lights 80 the latter of which may include a center high mount stop lamp (CHMSL, not shown) are mounted at the front and rear respectively of vehicle 10.

Figure 3:
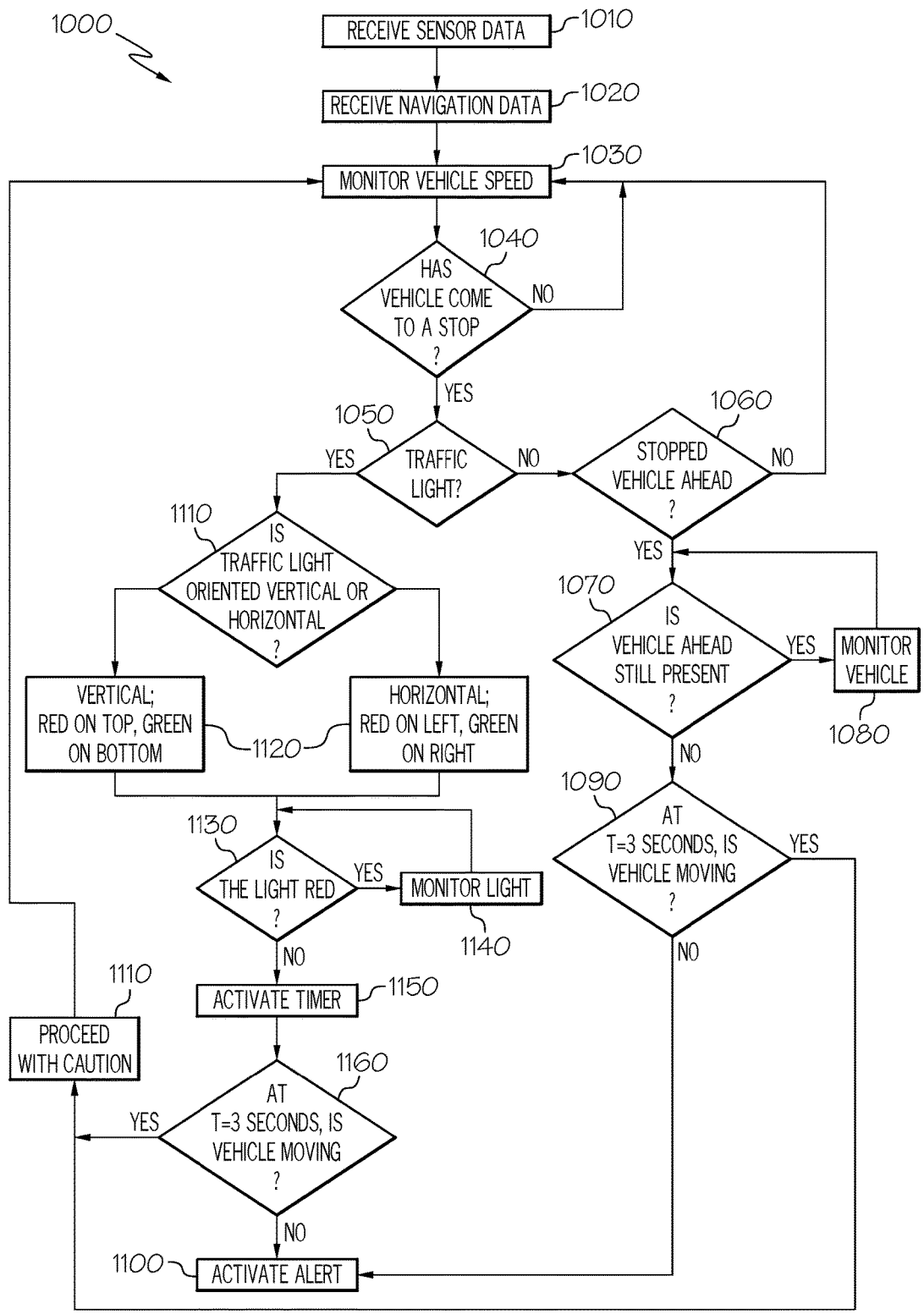
FIG. 3 depicts a flowchart highlighting one form of operation of the system of FIG. 1.

Referring next to FIG. 3, a flowchart of an exemplary process 1000 for notifying a distracted driver 5 using system 1 is shown. Initially, sensor data 1010, along with optional navigation data 1020 and vehicle 10 speed 1030 is acquired. At this time, a determination is made as to whether the vehicle 10 has come to a stop 1040. In situations where the vehicle 10 is determined to still be moving, the system 1 continues to monitor vehicle 10 speed 1030. On the other hand, in situations where the vehicle 10 is determined to have come to a stop, the system 1 ascertains the cause of the stoppage, which may include a traffic light 800, as shown in step 1050, or a stopped vehicle (or other temporary obstructions such a road detritus, pedestrians, animals or the like) ahead 1060. If it is determined that another vehicle or related obstruction is within the field-of-view of the sensors 300 at step 1070, the system 1 continues to monitor the obstruction 1080 Likewise, if it is determined that the vehicle ahead is no longer present (such as when it moves out of the field-of-view or at least far enough away from its previous position to determine that it has moved significantly), the system 1 makes a determination of whether the equipped vehicle 10 is moving after a set amount of time (for example, 3 seconds) 1090. Additional sensing may also be present at this time. For example, when the vehicle in front starts to move and the system 1 no longer detects that the brake lamps of the forward vehicle are illuminated, the system 1 will use such information in order to start a timer such that upon attainment of a predetermined time as discussed above, the system 1 alerts the driver 5 at step 1100 to start to move the equipped vehicle 10. This notification can be in the form of an audible or kinesthetic (i.e., haptic) signal. If the vehicle 10 is not moving, the system 1 alerts the driver 5 at step 1100. Contrarily, if the vehicle 10 is moving, the vehicle moves with caution 1110 while the system 1 continues to monitor the vehicle 10 speed as in step 1030.

In an optional form, the system 1 may determine for situations where a traffic light 800 is detected whether the light is in a vertical or horizontal orientation, as shown in step 1120. This is useful regardless of which traffic jurisdiction the vehicle 10 is traversing. After that, the system 1 ascertains whether the traffic light 800 is red at step 1130, and if so, to continue to monitor the light 800 at step 1140. Contrarily, if it is determined that the light 800 is no longer red, system 1 activates the timer at step 1150. The system 1 then makes a determination of whether the equipped vehicle 10 is moving after a set amount of time (for example, 3 seconds) 1160. If the vehicle 10 is not moving, the system 1 alerts the driver 5 at step 1100 in a manner similar to that discussed above that takes place after step 1090. It will be appreciated that the length of time for the system 1 to make the determination may be varied, and that all such set amounts of time are deemed to be within the scope of the present disclosure.

Significantly, the system 1 may be coupled with the measured or actual speed of vehicle 10 as part of monitoring traffic patterns in general and traffic situations in particular. In addition to vehicle 10 speed data, forward view and location information (as acquired by static maps, GPS 510 or the like) may also be used so that when the vehicle 10 comes to a stop, the system 1 will look in a V2I mode for either a traffic light 800 or other traffic signal (not shown), or in a V2V mode a stopped vehicle immediately in front of the equipped vehicle 10. It is feasible that a vehicle stopped in front of the equipped vehicle 10 is stopped at a traffic light 800 or other traffic control device, but that the equipped vehicle 10 cannot detect the presence of such traffic control device due to the distance or obstruction between the former and the latter. In this case, the forward vision capability of the system 1 and its radar, lidar, IR or camera-based sensors 300 may be made to look for evidence of a traffic situation from a vehicle in front of the equipped vehicle 10, such as illuminated rear brake lamps, or a radar or lidar image representative of the forward vehicle. Likewise, the equipped vehicle 10 may use these sensors 300 to ascertain vehicles, pedestrians, animals or other objects in front of the equipped vehicle 10 that may give rise to the traffic situation. Vehicle 10 may also use a signal received from the GPS 510 or the speedometer sensor 310A and processed by computer 100 as a way to determine if the equipped vehicle 10 has moved.

Likewise, the system 1 may be configured to recognize circumstances that fall outside of a traffic situation. In such case, the data being acquired by the sensors 300, when processed by the computer, may recognize that vehicle 10 is in a parking lot, private residence driveway or garage such that instead of alerting the driver as in step 1100, the system 1 goes into a logic loop or related holding pattern where it continues to monitor the vehicle 10 speed rather than start the driver-alerting timer. This circumstance may arise for example when the driver 5 brings the equipped vehicle 10 to a stop when there is a parked vehicle in front of the equipped vehicle 10, such as pulling into a parking space. At this time, the system 1 will recognize that there are no illuminated rear brake lamps on the forward vehicle. Additional data (such as from the GPS 510) could also be used to help the system 1 to determine that the equipped vehicle 10 is not in the vicinity of an intersection or traffic signal, which in turn can be used by the system 1 to indicate that vehicle 10 is not in the presence of a traffic situation. This latter circumstance (for example, if the driver 5 is intentionally stopping in a parking lot, at a residence, or for some other reason) is useful in that it helps to ascertain whether the vehicle 10 is even in a situation where the driver 5 should be monitored for distractions.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. For example, the system and methods using the system may be implemented in one or both of software and hardware, and that all variations on the embodiments of such system and method as discussed herein will be understood to be within the scope of the present disclosure. Furthermore, the order of steps associated with such methods may be changed, while various features of the system may be combined, added, removed, reordered, modified or the like, and still be within the scope of the present disclosure. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A driver notification system comprising:
a computer configured to:
 determine a location of a vehicle;
 determine the vehicle is stopped;
 determine if the vehicle is in a traffic situation wherein a freedom of forward movement of at least one adjacent vehicle is hindered by the vehicle; and
 determine whether to alert a driver to start moving the vehicle based on the determined location of the vehicle, the traffic situation, and in response to determining the vehicle is stopped; and
a human-machine interface responsive to the computer and configured to alert the driver to start moving the vehicle in response to the computer determining to alert the driver to start moving the vehicle.

2. The system of claim 1 further comprising:
a communication system comprising at least one of an antenna and a plurality of sensors, the communication system configured to acquire data that provides indicia of actual or expected vehicular movement in a traffic situation, wherein:
 the computer is signally cooperative with the communication system to process data received therefrom; and
 the computer is configured to make the determination as to whether to alert the driver to start moving the vehicle by comparing a change in status of the traffic situation that is conducive to the movement of the vehicle with whether the vehicle is undertaking such movement.

3. The system of claim 2, wherein the communication system comprises both the antenna and the plurality of sensors, at least one of which comprises a forward-looking sensor configured to detect a change in status of a traffic light such that when the traffic light changes from red to green, a first measure of the change in status of the traffic situation is achieved.

4. The system of claim 2, wherein the communication system comprises the plurality of sensors, wherein at least one sensor of the plurality of sensors comprises a forward-looking sensor configured to detect a change in status of brake lights in at least one vehicle forward of the vehicle such that when the brake light status changes from engaged to disengaged, a second measure of the change in status of the traffic situation is achieved.

5. The system of claim 2, wherein the communication system comprises the plurality of sensors, wherein at least one sensor of the plurality of sensors comprises a forward-looking sensor configured to detect a distance between the vehicle and at least one vehicle forward of the vehicle such that when the distance is more than a threshold value, a third measure of the change in status of the traffic situation is achieved.

6. The system of claim 2, wherein the communication system comprises the plurality of sensors, wherein at least one sensor of the plurality of sensors comprises a forward-looking sensor configured to detect a rate of separation between the vehicle and at least one vehicle forward of the vehicle such that when the rate of separation is more than a threshold value, a fourth measure of the change in status of the traffic situation is achieved.

7. The system of claim 2, wherein the communication system comprises the plurality of sensors, wherein the plurality of sensors is selected from the group consisting of optical sensors, acoustic sensors, lidar sensors, radar sensors, infrared sensors and combinations thereof.

8. The system of claim 3, wherein the change in status of the traffic situation as acquired by the plurality of sensors and processed by the computer is determined by a change in status of at least two of a traffic control device, a brake light status in at least one vehicle forward of the vehicle, a distance between the vehicle and the at least one vehicle forward of the vehicle and a rate of separation between the vehicle and the at least one vehicle forward of the vehicle.

9. The system of claim 1, wherein the location of the vehicle is determined based on navigational data.

10. The system of claim 9, the computer is configured to:
   determine the location of the vehicle is in a parking lot based on the navigational data; and
   determine not to alert the driver to start moving the vehicle when the location of the vehicle is determined to be in the parking lot.

11. The system of claim 10, the computer is configured to:
   determine the location of the vehicle is in at least one of a driveway and a garage of a private residence based on the navigational data; and
   determine not to alert the driver to start moving the vehicle when the location of the vehicle is determined to be in at least one of the driveway and the garage of the private residence.

12. The system of claim 2, wherein the alert comprises at least one of an audible and visual alert conveyed to the driver after a computer-initiated delay.

13. The system of claim 2, wherein when the vehicle is not in a traffic situation, the system monitors the speed of the vehicle but does not alert the driver.

14. A vehicle comprising:
   a platform comprising a wheeled chassis defining a passenger compartment and an engine compartment comprising an engine disposed therein,
   a control apparatus cooperative with the wheeled chassis and the engine in order to provide motive control; and
   a driver notification system comprising:
      a computer configured to:
         determine a location of the vehicle;
         determine the vehicle is stopped;
         determine if the vehicle is in a traffic situation wherein a freedom of forward movement of at least one adjacent vehicle is hindered by the vehicle; and
         determine whether to alert a driver to start moving the vehicle based on the determined location of the vehicle, the traffic situation, and in response to determining the vehicle is stopped; and
      a human-machine interface responsive to the computer and configured to alert the driver to start moving the vehicle in response to the computer determining to alert the driver to start moving the vehicle.

15. The vehicle of claim 14, wherein the alert comprises at least one of an audible, haptic and visual warning to the driver.

16. The vehicle of claim 14, further comprising a communication system comprising at least one of an antenna and a plurality of sensors, the communication system configured to acquire data that provides indicia of actual or expected vehicular movement in a traffic situation, wherein:
   the computer is signally cooperative with the communication system to process data received therefrom; and
   the computer is configured to make the determination as to whether to alert the driver to start moving the vehicle by comparing a change in status of the traffic situation that is conducive to the movement of the vehicle with whether the vehicle is undertaking such movement.

17. A method of notifying a driver, the method comprising:
   determining a location of a vehicle with a computer;
   determining the vehicle is stopped with the computer;
   determining if the vehicle is in a traffic situation wherein a freedom of forward movement of at least one adjacent vehicle is hindered by the vehicle;
   determining whether to alert a driver to start moving the vehicle based on the determined location of the vehicle, the traffic situation, and in response to determining the vehicle is stopped; and
   alerting the driver to start moving the vehicle with a human-machine interface in response to the computer determining to alert the driver to start moving the vehicle.

18. The method of claim 17, wherein the computer is situated on-board the vehicle.

19. The method of claim 17, further comprising using the computer to enter into a logic loop where movement of the vehicle is monitored in response to the computer determining not to alert the driver to start moving the vehicle.

20. The method of claim 17, wherein alerting the driver comprises first starting a timer and then providing at least one of an audible, haptic and visual warning to the driver once a threshold length of time corresponding to the timer has been attained.

* * * * *

UNITED STATES PATENT AND TRADEMARK OFFICE
CERTIFICATE OF CORRECTION

PATENT NO. : 10,290,210 B2
APPLICATION NO. : 15/403740
DATED : May 14, 2019
INVENTOR(S) : Michael J. Wolterman Page 1 of 1

It is certified that error appears in the above-identified patent and that said Letters Patent is hereby corrected as shown below:

In the Specification

In Column 6, Line 34, delete "wireles sly" and insert --wirelessly--, therefor.

In the Claims

In Column 14, Claim 8, Line 64, after "vehicle", insert --,--.

Signed and Sealed this
Ninth Day of July, 2019

Andrei Iancu
*Director of the United States Patent and Trademark Office*